(12) United States Patent
Huang et al.

(10) Patent No.: US 11,858,141 B2
(45) Date of Patent: Jan. 2, 2024

(54) IMPEDANCE CONTROL METHOD, AND CONTROLLER AND ROBOT USING THE SAME

(71) Applicant: UBTECH ROBOTICS CORP LTD, Shenzhen (CN)

(72) Inventors: Liqun Huang, Shenzhen (CN); Xiaoyu Ren, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 388 days.

(21) Appl. No.: 17/408,512

(22) Filed: Aug. 23, 2021

(65) Prior Publication Data

US 2022/0009095 A1 Jan. 13, 2022

Related U.S. Application Data

(63) Continuation of application No. PCT/CN2020/140408, filed on Dec. 28, 2020.

(30) Foreign Application Priority Data

Jul. 8, 2020 (CN) .......................... 202010650259.6

(51) Int. Cl.
   *B25J 9/16* (2006.01)
(52) U.S. Cl.
   CPC ........... *B25J 9/1633* (2013.01); *B25J 9/1607* (2013.01); *B25J 9/1641* (2013.01); *B25J 9/1653* (2013.01); *B25J 9/1664* (2013.01)
(58) Field of Classification Search
   CPC ...... B25J 9/1633; B25J 9/1607; B25J 9/1641; B25J 9/1653; B25J 9/1664; G05B 2219/39347
   See application file for complete search history.

(56) References Cited

U.S. PATENT DOCUMENTS 10,919,149 B2 * 2/2021 Kawase ................. B25J 9/1664
2014/0371905 A1 * 12/2014 Eberst ................. G05B 19/4182
   700/253

(Continued)

FOREIGN PATENT DOCUMENTS

| CN | 101332604 A | 12/2008 |
| CN | 108406765 A | 8/2018 |
| CN | 111319036 A | 6/2020 |

OTHER PUBLICATIONS

ISR for PCT/CN2020/140408.
Written opinions of ISA for PCT/CN2020/140408.

*Primary Examiner* — Kira Nguyen (57) ABSTRACT

An impedance control method as well as a controller and a robot using the same are provided. The method includes: obtaining joint motion information and joint force information in the joint space of a robotic arm and an actual interaction force acting on an end-effector, and calculating actual motion information of the end-effector in the task space based on the joint motion information; calculating a corrected desired trajectory using environment information and a desired end-effector interaction force, and calculating the impedance control torque based on the joint force information, the actual interaction force, the actual motion information, and desired end-effector information including the corrected desired trajectory and determining a compensation torque based on a nonlinear term in a constructed dynamics equation so as to perform a joint torque control on the robotic arm based on the impedance control torque and the compensation torque.

20 Claims, 9 Drawing Sheets

(56) References Cited

U.S. PATENT DOCUMENTS

2017/0274530 A1\* 9/2017 Mottram ................. B25J 9/1628
2019/0184560 A1\* 6/2019 Liu ........................ B25J 9/1605
2020/0282558 A1\* 9/2020 Kim ....................... B25J 9/1607
2021/0362334 A1\* 11/2021 Yamane ............. G05B 19/4155

\* cited by examiner

IMPEDANCE CONTROL METHOD, AND CONTROLLER AND ROBOT USING THE SAME

CROSS REFERENCE TO RELATED APPLICATIONS

The present application is a continuation-application of International Application PCT/CN2020/140408, with an international filing date of Dec. 28, 2020, which claims foreign priority of Chinese Patent Application No. 2020106502596, filed on Jul. 8, 2020 in the State Intellectual Property Office of China, the contents of all of which are hereby incorporated by reference.

BACKGROUND

1. Technical Field

The present disclosure relates to robot control technology, and particularly to an impedance control method as well as a controller and a robot using the same.

2. Description of Related Art

Different from the current widely used position-controlled robotic arms, the torque-controlled robotic arms can directly control the output force and have faster response speed and better safety, and can better meet the requirements of service robots, collaborative robots, or the like that need high safety and compliance. However, the torque-controlled robotic arms are more complicated that the full dynamics of robot needs to be considered while having high nonlinearity.

The impedance control in Cartesian space has good flexibility and is suitable for interactive occasions. However, its goal is to control the relationship between the force and the position at the end-effector of the robotic arm. It cannot achieve individual control of position or force, and the desired interaction force of the robotic arm cannot be tracked. In addition, when performing the impedance task in a Cartesian task space, due to the coupling of the inertial matrix of the end-effector between different directions of the end-effector, the represented impedance behavior will also have directional coupling, that is, if only subject to the force in the vertical direction, the other two directions that are not subject to the external force will also be moved, and accurate desired force control cannot be achieved.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure.

Generally, the components in the embodiments of the present disclosure that are described and shown in the drawings may be arranged and designed in various different configurations. Therefore, the following detailed descriptions for the embodiments of the present disclosure are not intended to limit the scope of the present disclosure, but merely represents the selected embodiments of the present disclosure. Based on the embodiments of the present disclosure, all other embodiments obtained by those skilled in the art without creative work shall fall within the scope of the present disclosure.

Hereinafter, the terms "including". "having" and their cognates that are used in the embodiments of the present disclosure are only intended to represent specific features, numbers, steps, operations, elements, components, or combinations of the foregoing, and should not be understood as first excluding the possibility to have one or more other features, numbers, steps, operations, elements, components, or combinations of the foregoing or add one or more features, numbers, steps, operations, elements, components, or combinations of the foregoing.

In addition, the terms "first", "second", "third", and the like in the descriptions are only used for distinguishing, and cannot be understood as indicating or implying relative importance.

Unless otherwise defined, all terms (including technical and scientific terms) used herein have the same meanings as commonly understood by those skilled in the art of the embodiments of the present disclosure. The terms (e.g., those defined in commonly used dictionaries) will be interpreted as having the same meaning as the contextual meaning in the related technology and should not be interpreted as having idealized or overly formal meanings, unless clearly defined in the embodiments of the present disclosure.

Exemplarily, taking a torque-controlled robotic arm (or torque-controlled robot) as an example, since the robotic arm has n degrees of freedom, and its end-effector requires m degrees of freedom when performing tasks, in order to make the end-effector compliant when interacting with the external environment, impedance control is usually carried out in Cartesian space. However, when the end-effector of the robotic arm performs impedance tasks in Cartesian space, due to the coupling of the end-effector inertial matrix (or inertia matrix), the impedance behavior represented by the end-effector will also have directional coupling, that is, if only subject to the force in the vertical direction, the other two directions that are not subject to the external force will also be moved, and will deviate from the pre-planned trajectory.

Figure 1:
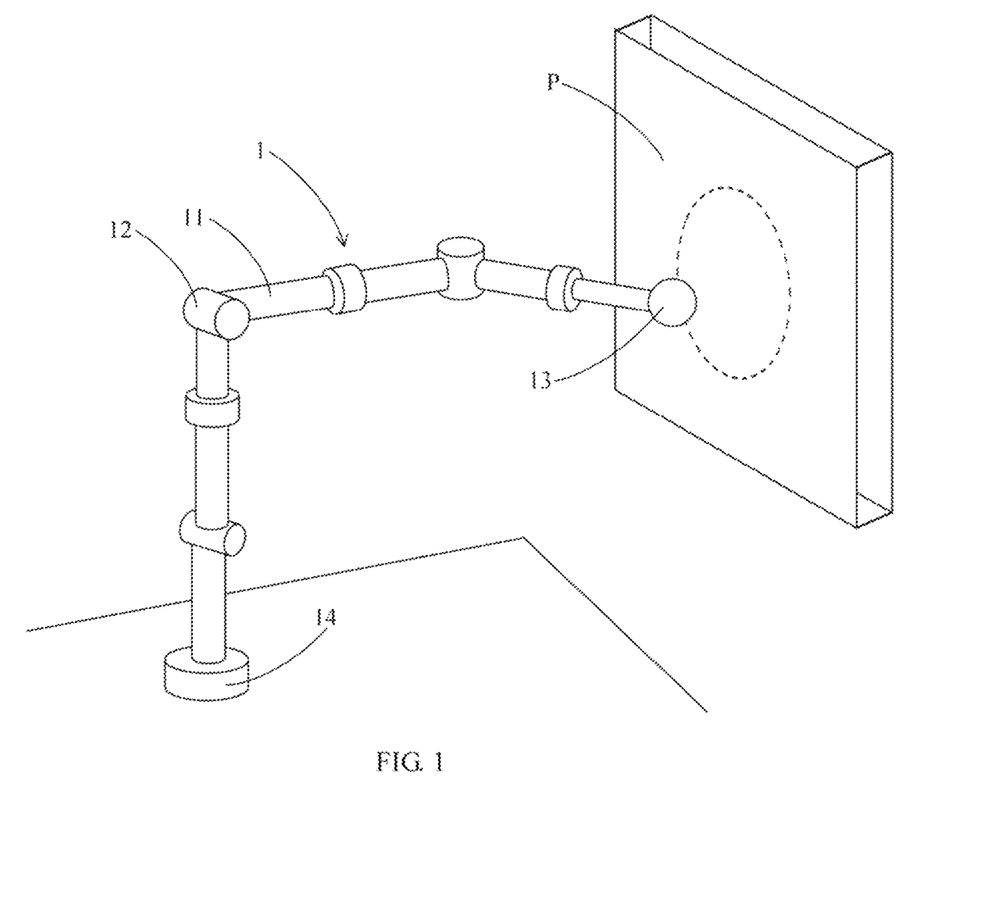
FIG. 1 is a schematic diagram of an application of a robotic arm according to an embodiment of the present disclosure.
Figure 2:
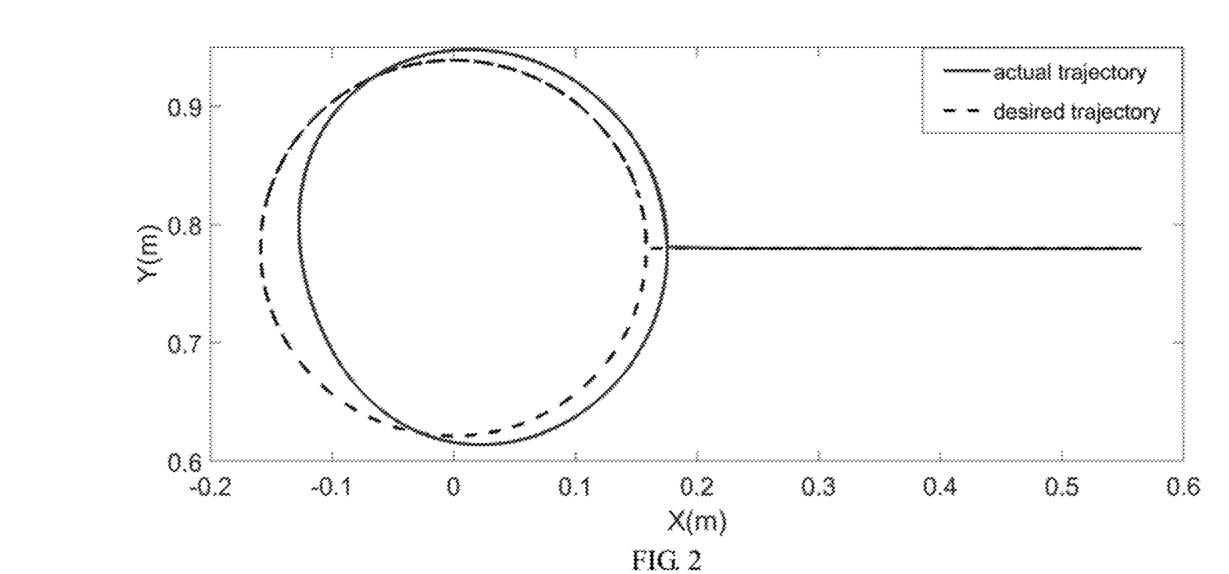
FIG. 2 is a schematic diagram of a trajectory obtained through an impedance control method in the prior art.
Figure 3:
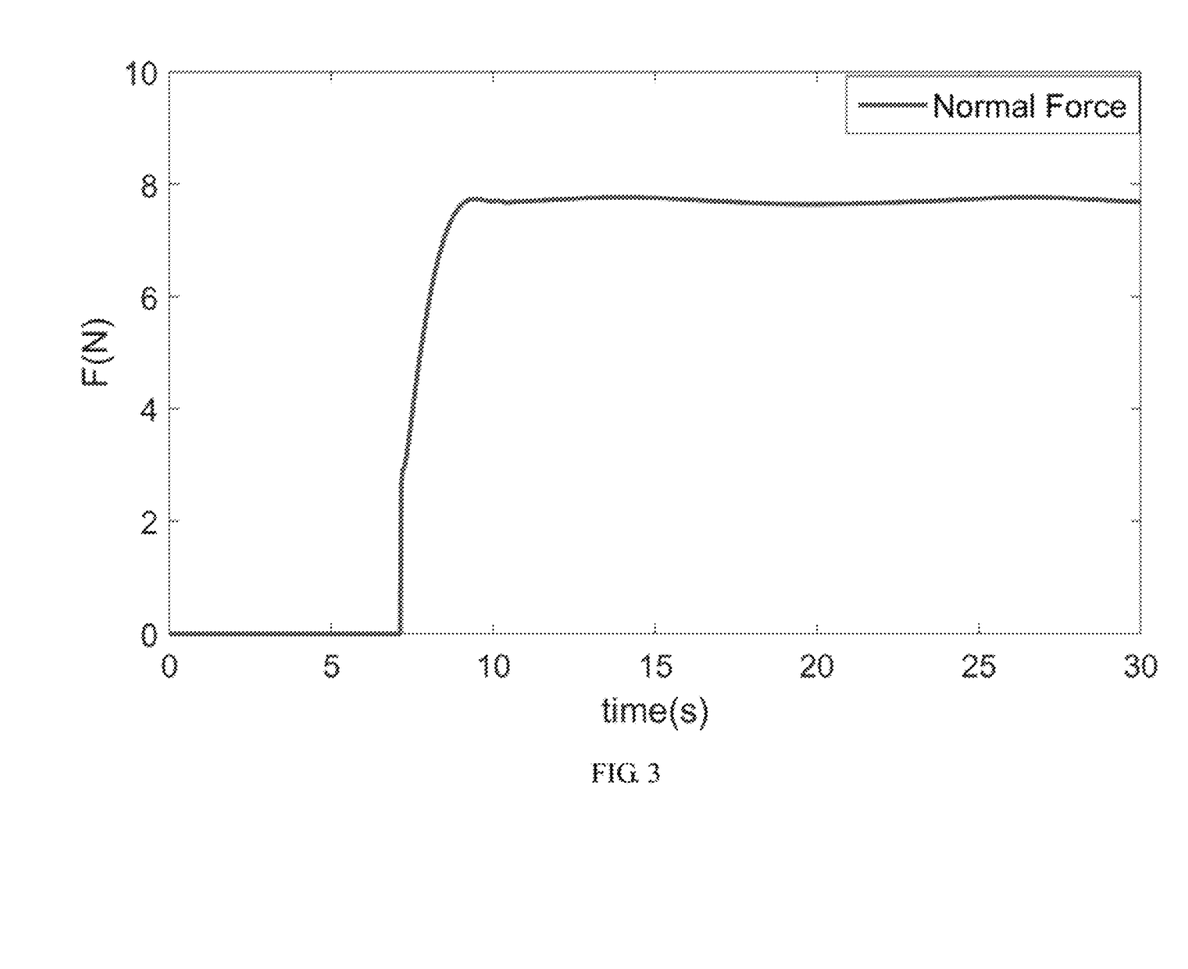
FIG. 3 is a schematic diagram of tracking end-effector forces obtained through an impedance control method in the prior art.

FIG. 1 is a schematic diagram of an application of a robotic arm according to an embodiment of the present disclosure. A robotic arm 1 may include arm(s) (i.e., link (s)) 11, joint(s) 12, an end-effector 13, and a controller 14. The joint 12 may be connected between the end-effector 13 and an arm 11 and/or between arms 11. The controller 14 controls (a servo of) the joint 12 to move (e.g., controls the servo of the joint 12 to rotate), thereby moving the robotic arm 1. As shown in FIG. 1, as an example, suppose that the end-effector 13 of the robotic arm 1 is in contact with an elastic plane P (i.e., x-y plane), the direction of the contact force is z-direction, and draws a circle while keeping the contact force (in Newton, assumed as ION) constant. FIG. 2 is a schematic diagram of a trajectory obtained through an impedance control method in the prior art. As shown in FIG. 2, when the existing impedance control method is adopted, due to the inertial matrix M in robot dynamics is coupled in the x-y-z direction, the circular trajectory of the end-effector 13 in the x-y plane will be affected by the force in the z direction, and therefore deviate from the desired trajectory. Generally, the ideal case should be that in which direction the external force is subjected to and in which direction the compliant motion will be produced, while the other directions will not be affected. The phenomenon shown in FIG. 2 is due to the inertial matrix of the end-effector have coupling in all directions. FIG. 3 is a schematic diagram of tracking end-effector forces obtained through an impedance control method in the prior art. As shown in FIG. 3, by tracking the desired force of the end-effector, it can also find that the actual interaction force acting on the end-effector cannot reach the desired interactive force of ION.

Based on the above-mentioned problems, an embodiment of the present disclosure provides an impedance control method, which correct the impedance control law through force sensor information and environmental information so as to achieve direction decoupled impedance control. As a result, it not only conducive to improve the control accuracy of the torque-controlled robotic arm, but also conducive to improve the flexibility and safety of the robotic arm, and therefore helps to enhance the application of the robotic arm in human-robot interaction. In addition, considering that the tasks are usually performed by the end-effector, the nonlinear term in the dynamics equation is also compensated in real time, thereby simplifying the control complexity of the torque-controlled robotic arm.

Embodiment 1

Figure 4:
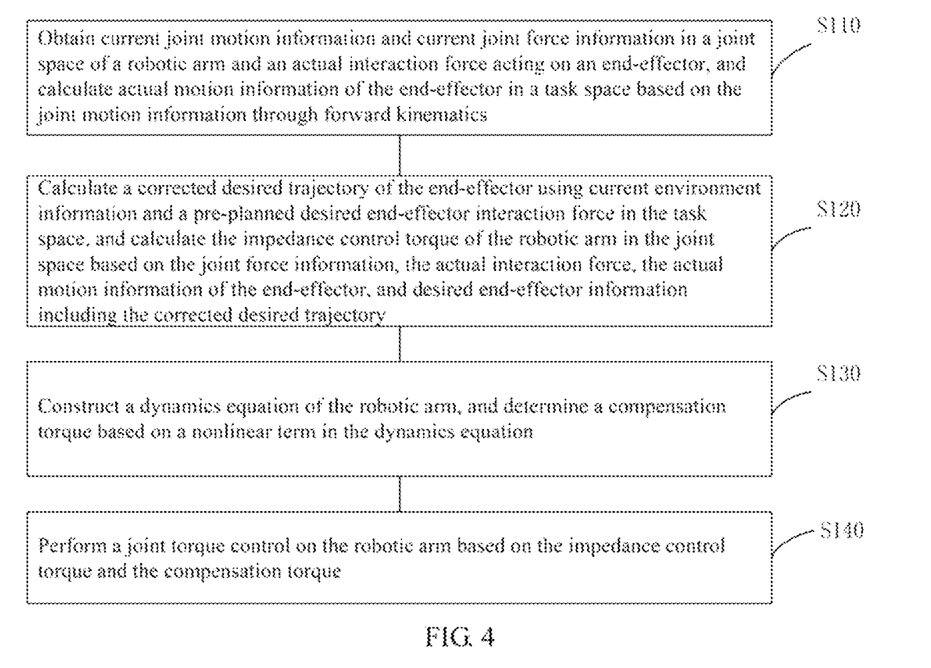
FIG. 4 is a flow chart of a first embodiment of an impedance control method according to the present disclosure.

FIG. 4 is a flow chart of a first embodiment of an impedance control method according to the present disclosure. In this embodiment, the impedance control method is a computer-implemented method executable for a processor. The method can be applied to torque controls of a robotic arm or robot with redundant degrees of freedom and with degree of freedom at the end-effector. In this embodiment, since the impedance control method is aimed at impedance controls in a Cartesian space, that is, the end-effector of the robotic arm performs tasks in the Cartesian space, the Cartesian spaces also called the task space. The method may be implemented through an impedance control apparatus shown in FIG. 9. As shown in FIG. 4, the method includes the following steps.

S110: obtaining current joint motion information and current joint force information in a joint space of the robotic arm and an actual interaction force acting on an end-effector of the robotic arm, and calculating actual motion information of the end-effector in a task space of the robotic arm based on the joint motion information through forward kinematics.

In one embodiment, the actual motion information of the end-effector mainly includes the actual position and actual speed of the end-effector in the current task space. As an example, the joint motion information of each joint of the robotic arm in the joint space at each moment can be obtained first, and then the actual motion information of the end-effector of the robotic arm in the task space can be calculated based on the kinematic relationship between each joint of the robotic arm and the end-effector, that is, using forward kinematics.

For example, the joint motion information may include the angular displacement q and the angular velocity 4 of each joint, where q and q are related to the joint and are both n*1 column vectors, where n is the degree of freedom of the robotic arm. As an example, the angular displacement of each joint may be collected through an angular displacement sensor, a position encoder or the like that is disposed at a corresponding position of the joint, and then the corresponding angular velocity may be obtained by differentiating the angular displacement. Alternatively, the angular velocity of each joint may also be measured through a corresponding angular velocity sensor directly.

Therefore, the current actual position x and the actual speed ẋ of the end-effector may be calculated based on a motion relationship between the joint of the robot and the end-effector using equations of:

$$x=f(q); \text{ and}$$

$$\dot{x}=J\dot{q};$$

where, x and ẋ are both m*1 column vectors, m is the degree of freedom of the end-effector of the robotic arm, f(q) represents a mapping relationship between the angular displacement q of the joint and the position x of the end-effector which can be calculated through robot forward kinematics, and J is a m*n Jacobian matrix representing a mapping relationship between a joint velocity and an end-effector linear velocity.

The above-mentioned actual interaction force acting on the end-effector is the interaction force between the end-effector and the environment, which may be measured through a force sensor such as a six-dimensional force/torque sensor mounted at the end-effector.

The above-mentioned joint force information refers to an external torque generated at each joint due to the force of the environment acting on the robotic arm. As an example, the external torque may be collected through a torque sensor corresponding to each joint.

S120: calculating a corrected desired trajectory of the end-effector using current environment information and a pre-planned desired end-effector interaction force in the task space, and calculating the impedance control torque of the robotic arm in the joint space based on the joint force information, the actual interaction force, the actual motion information of the end-effector, and desired end-effector information including the corrected desired trajectory.

In order to enable the robotic arm to achieve a corresponding task, the robotic arm is usually controlled according to the pre-planned end-effector desired trajectory. In some embodiments, the desired end-effector information of the robotic arm may include, but is not limited to, a desired trajectory, a desired speed and a desired acceleration of the end-effector, a desired interaction force between the end-effector and the environment, and the like.

In this embodiment, considering that the existing impedance control methods often have problems as shown in FIG. 2 and FIG. 3, when performing the impedance control, the impedance control law will be corrected to decouple the directions, thereby achieving the precise control of the robotic arm and the like.

The above-mentioned step S120 mainly includes two parts, namely, adjusting the desired end-effector trajectory, and calculating the corresponding impedance control torque using the adjusted desired trajectory.

Generally, the interaction force between the end-effector and the environment should be jointly determined by the stiffness of the robotic arm and the stiffness of the environment. However, in the existing impedance control methods, environmental factors are not considered at all. Therefore, in this embodiment, the influences of environmental factors are considered, and the end-effector desired trajectory are re-expected to obtain the corrected desired trajectory including the environmental factors. It can be understood as replacing the planned desired trajectory with the recalculated desired trajectory to correct the desired trajectory.

For example, the above-mentioned environment information may include an environment equivalent stiffness and an environment position. It should be noted that, the environment refers to an external object directly in contact with the end-effector, and the environment equivalent stiffness is related to the stiffness of the environment and that of the robotic arm, which is a function of the stiffness of the environment and that of the robotic arm, for example, if the stiffness of the environmental is $K_f$ and the stiffness of the robotic arm is $K_d$, the environment equivalent stiffness $K_{eq}$ will be $$K_{eq} = \frac{K_f K_d}{K_f + K_d}.$$

Therefore, the corrected desired trajectory $x_{ref}^m$ of the end-effector may be calculated based on the current environment equivalent stiffness $K_{eq}$, the current environment position $x_f$ and the desired end-effector interactive force $F_{ref}$ through an equation of:

$$x_{ref}^m = x_f - \frac{F_{ref}}{K_{eq}}$$

Then, the impedance control torque at the next moment is calculated using the corrected desired trajectory while considering the actual force acting on the end-effector.

Figure 5:
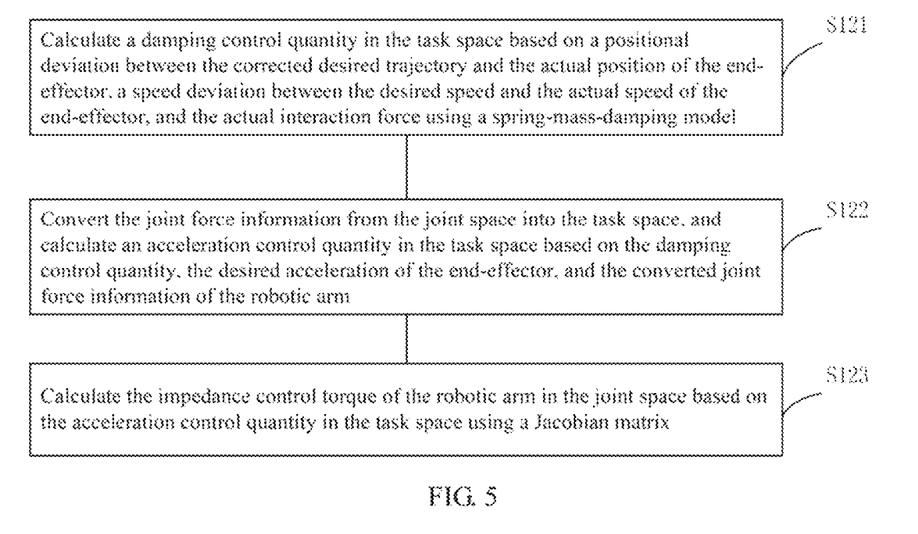
FIG. 5 is a flow chart of an example of calculating the impedance control torque in the impedance control method of FIG. 4.

FIG. 5 is a flow chart of an example of calculating the impedance control torque in the impedance control method of FIG. 4. As shown in FIG. 5, the calculation process of the impedance control torque mainly includes the following steps.

S121: calculating a damping control quantity in the task space based on a positional deviation between the corrected desired trajectory and the actual position of the end-effector, a speed deviation between the desired speed and the actual speed of the end-effector, and the actual interaction force using a spring-mass-damping model.

As an example, if the corrected desired trajectory is $x_{ref}^m$, and the current actual position of the end-effector is $X$, the positional deviation will be $x_{ref}^m - x$. Similarly, if the desired speed of the end-effector is $\dot{x}_{ref}$, and the actual speed is $\dot{X}$, the speed deviation will be $\dot{x}_{ref} - \dot{x}$.

In order to realize the compliance control of the robotic arm, the robotic arm may be equivalent to a spring-mass-damping system, and the corresponding impedance control quantity may be calculated based on the spring-mass-damping model. As an example, if the stiffness matrix of the spring in the impedance control is $K_d$ (which is equivalent to the stiffness of the robotic arm), the inertial matrix is $M_d$, the damping matrix is $D_d$, and the actual interaction force between the end-effector and the environment is $F_{ext}$, the damping control quantity $\Delta \ddot{x}_{cmd}$ calculated based on the above-mentioned spring-mass-damping model will be:

$$\Delta \ddot{x}_{cmd} = M_d^{-1}(D_d(\dot{x}_{ref} - \dot{x}) + K_d(x_M^m - x) + F_{ext})$$

S122: converting the joint force information from the joint space into the task space, and calculating an acceleration control quantity in the task space based on the damping control quantity, the desired acceleration of the end-effector, and the converted joint force information of the robotic arm.

As an example, the acceleration control quantity $\ddot{x}_{cmd}$ may be calculated using the impedance control quantity calculated in the above-mentioned step S121 while taking the external torque acting on the robotic arm into account through an equation of:

$$\ddot{x}_{cmd} = \ddot{x}_{ref} + \Delta \ddot{x}_{cmd} - JM(q)^{-1}\tau_{ext};$$

where, $\ddot{x}_{ref}$ is the desired acceleration, $\Delta \ddot{x}_{cmd}$ is the damping control quantity, $\tau_{ext}$ is the external joint torque acting on the robotic arm, $M(q)$ is a n*n positive definite symmetric square matrix which represents the inertial matrix (i.e., the inertia matrix) of the robotic arm, and $J$ is a m*n Jacobian matrix.

S123: calculating the impedance control torque of the robotic arm in the joint space based on the acceleration control quantity in the task space using a Jacobian matrix.

Since the calculated acceleration control quantity is for the end-effector in the task space, in order to realize the torque control of the joint, it needs to be further converted into the torque control quantity of the joint space, that is, the above-mentioned impedance control torque. In which, $J^\#$ is the pseudo-inverse of the Jacobian matrix $J$. As an example, the impedance control torque $\tau_{cmd}$ may be calculated through an equation of:

$$\tau_{cmd} = M(q) J^\# \ddot{x}_{cmd}$$

S130: constructing a dynamics equation of the robotic arm, and determining a compensation torque based on a nonlinear term in the dynamics equation.

In this embodiment, considering that the impedance control method is for the torque-controlled robotic arm, while the torque-controlled robotic arms have high nonlinearity, the impedance control method achieves the direction decoupled impedance control while compensates the nonlinear terms such as the Coriolis force, centrifugal force and the gravity term in the joint space or the task space in real time.

In the first embodiment, the dynamics equation is a dynamics equation of the robotic arm in the joint space. For example, the force acting on the robotic arm, the centrifugal force, the Coriolis force, the gravity and the like in the joint space can be calculated based on the joint motion information of each joint of the robotic arm that is obtained in the joint space. As an example, the dynamics equation of the joint space is:

$$M(q)\ddot{q}+C(q,\dot{q})\dot{q}+G(q)=\tau_c+\tau_{ext};$$

where, $C(q,\dot{q})$ is a n*n centrifugal and Coriolis matrix, which can be calculated according to the joint angular displacement q, the joint angular velocity $\dot{q}$, and other joint motion information, $G(q)$ is a n*1 column vector composed of the gravity acting on each link of the robotic arm, $\tau_c$ represents the total control torque acting on the robotic arm, which is a n*1 column vector, and $\tau_{ext}$ represents a column vector composed of the external torque acting on the robotic arm, which is a n*1 column vector.

Therefore, a compensation will be performed on the nonlinear terms including Coriolis force, centrifugal force, gravity term and the like. At this time, the compensation term $\tau_{compensation}$ is $C(q,\dot{q})\dot{q}+G(q)$.

In the second embodiment, the dynamics equation is a dynamics equation of the robotic arm in the task space. As an example, the construction of the dynamics equation of the task space includes: constructing the dynamics equation of the robotic arm in the joint space first, and then converting the dynamics equation in the joint space into the dynamics equation in the task space based on a motion relationship between each joint of the robotic arm and the end-effector. For example, according to the dynamics equation of the above-mentioned joint space, the dynamics equation of the task space will be:

$$J^{\#T}M(q)J^{\#}\ddot{x}_{cmd}+J^{\#T}(C(q,\dot{q})\dot{q}-M(q)J^{\#}\dot{J})J^{\#}\dot{x}+J^{\#T}G(q)=J^{\#T}\tau_c+J^{\#T}\tau_{ext};$$

where, $J^{\#T}$ is the inverse of the transpose of the Jacobian matrix J.

Considering that there are two non-linear terms in the task space, that is, the first non-linear term $(C(g,\dot{q})\dot{q}-M(q)J^{\#}\dot{J})J^{\#}\dot{x}$ containing the centrifugal force and Coriolis force matrix and the second non-linear term $G(q)$ containing the gravity vector, the dynamics equation will be linearized by compensating the Coriolis force and centrifugal force term and the gravity term in the task space. As an example, the compensation torque $\tau_{compensation}$ will be:

$$\tau_{compensation}=(C(q,\dot{q})\dot{q}-M(q)J^{\#}\dot{J})J^{\#}\dot{x}+G(q)$$

It should be noted that, as in the above-mentioned first embodiment, the dynamic compensation of the robotic arm is usually performed in the joint space to compensate the nonlinear terms including Coriolis force, centrifugal force, gravitational terms and the like, that is, the compensation term is $C(q,\dot{q})\dot{q}+G(q)$. At this time, the compensated dynamics equation will be simplified to $M(q)\ddot{q}=\tau_c+\tau_{ext}$. According to the kinematic conversion relationship between the joint and the end-effector of the robot (see the above-mentioned step S110), it can be known that the compensated dynamics equation of the joint space will be converted into the dynamics equation of the task space, that is, $M(q)J^{\#}(\ddot{x}-\dot{J}\dot{q})=\tau_c+\tau_{ext}$. It can be seen that, for the task space, there are still non-linear terms related to joint speed.

Considering that the task of the actual robotic arm is performed in the Cartesian space of the end-effector, the above-mentioned second embodiment directly compensate the nonlinear term in the task space in real time. By compensating the centrifugal force, the Coriolis force and the gravity term in the dynamics equation of the task space, the dynamics equation of the task space will be simplified to $J^{\#T}M(q)J^{\#}\ddot{x}_{cmd}=J^{\#T}\tau_c+J^{\#T}\tau_{ext}$. It can be seen from the above that, a simpler and more intuitive end-effector task planning can be realized based on the simplified dynamics equation of the task space. Moreover, it can be seen from the compensation terms in the task space that, the robotic arm can be compensated more in the task space, which achieves real linearization and greatly simplifies the control complexity of the torque-controlled robotic arm.

S140: performing a joint torque control on the robotic arm based on the impedance control torque and the compensation torque.

As an example, the calculated impedance control torque and the compensation torque are superimposed as the total control torque $\tau_c$ required by the robotic arm, that is, $\tau_c=\tau_{cmd}+\tau_{compensation}$, and then sent to each joint to perform corresponding torque control, thereby performing the corresponding task.

Figure 6:
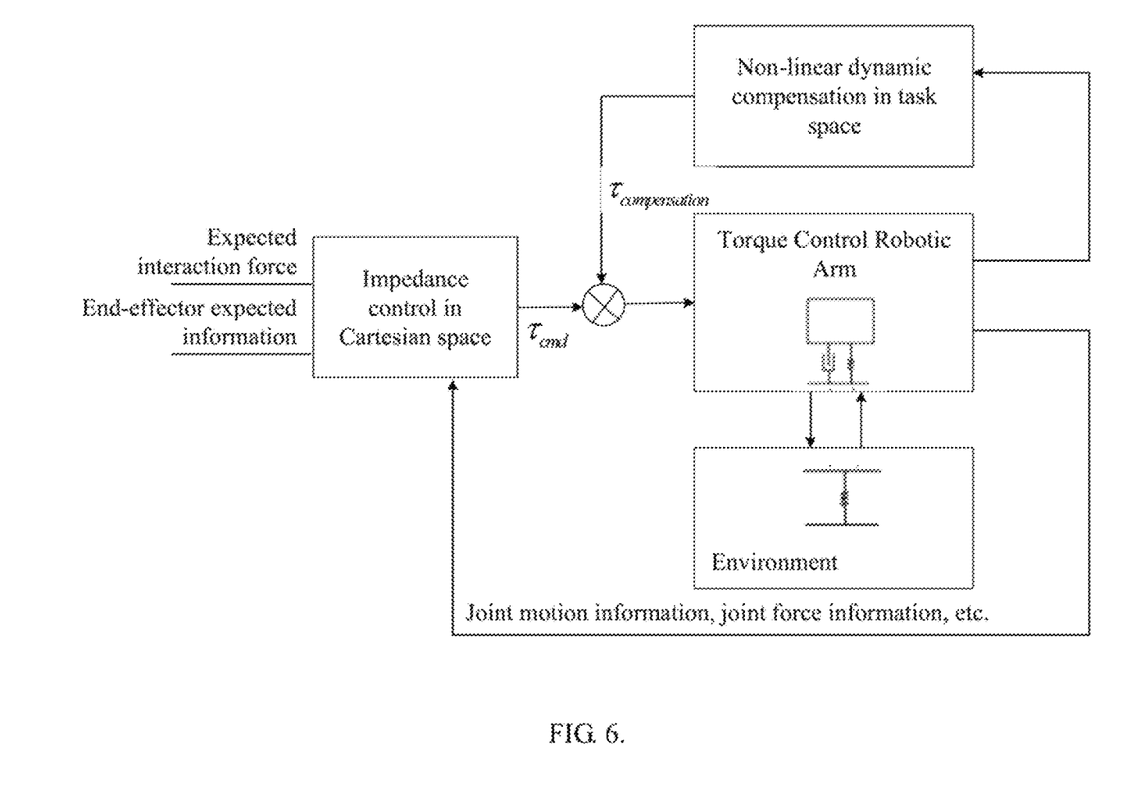
FIG. 6 is a schematic diagram of an application of a control frame of a robotic arm according to an embodiment of the present disclosure.

FIG. 6 is a schematic diagram of an application of a control frame of a robotic arm according to an embodiment of the present disclosure. It should be noted that, considering that a task is usually performed at the end-effector of the robotic arm, and the impedance of the end-effector has coupling in all directions while the force of the end-effector cannot be accurately tracked. As shown in FIG. 6, in this embodiment, the impedance control method introduces the actual external force information (including the interaction force realized at the end-effector and the external joint torque acting on the robotic arm) measured by a force sensor and the environment information into the task space, so that when the robot interacts with the external environment, it represents the compliance with direction decoupling. At the same time, the impedance control law is corrected using the corrected desired trajectory obtained by combining the environmental information, and accurate end-effector force tracking can also be realized, which enhances the application of the impedance control when the force of the end-effector needs to be controlled. For example, when the end-effector of the robotic arm is controlled to write, the output force of the end-effector can be easily controlled to achieve different strengths of writing. At the same time, in this embodiment, the impedance control method also compensates the non-linear term in dynamics in real time, especially performing direct compensation in the task space, which can greatly simplify the control complexity and well solve the nonlinearity, the complex control and other issues of the torque-controlled robotic arm.

Figure 7:
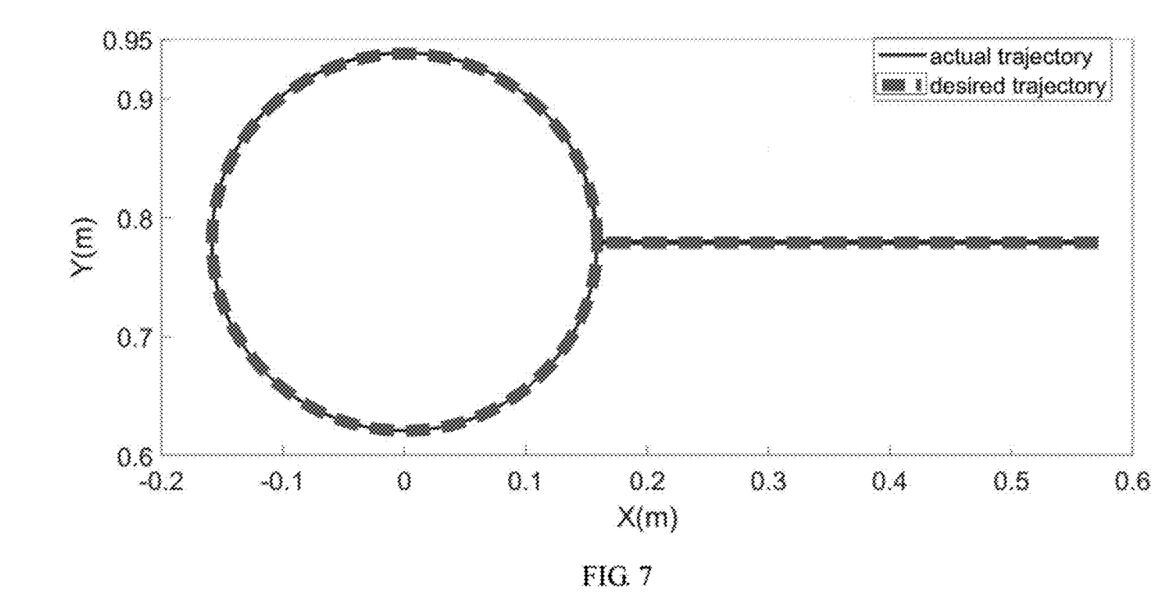
FIG. 7 is a schematic diagram of a trajectory obtained in a practical testing of an impedance control method of an embodiment of the present disclosure.
Figure 8:
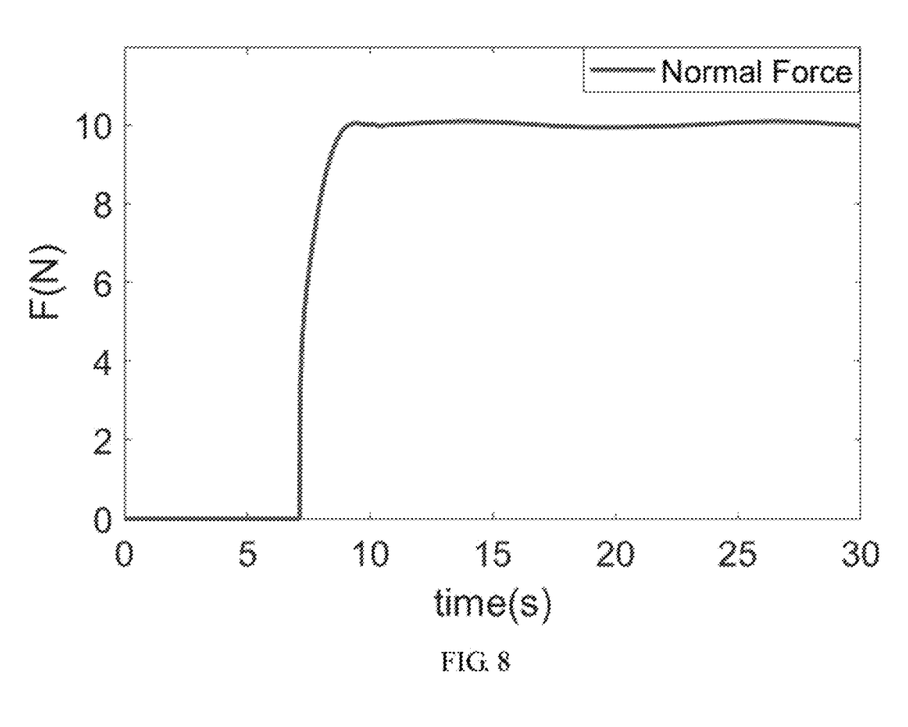
FIG. 8 is a schematic diagram of tracking end-effector forces obtained through an impedance control method of an embodiment of the present disclosure.

For example, in the torque-controlled robotic arm shown in FIG. 1, the impedance control method of this embodiment is adopted, that is, when the direction decoupled impedance control is adopted, since the actual external force information collected by the force sensor and the environment information are used to correct the control law, the influence of the inertial matrix (or the inertia matrix) at the end-effector is eliminated. FIG. 7 is a schematic diagram of a trajectory obtained in a practical testing of an impedance control method of an embodiment of the present disclosure. As shown in FIG. 7, it can be seen from the trajectory of the x-y plane that the force in the z direction does not affect the motion in the x-y direction, and the desired trajectory in the figure can be obtained. FIG. 8 is a schematic diagram of tracking end-effector forces obtained through an impedance control method of an embodiment of the present disclosure. As shown in FIG. 8, by taking the environment model into account, an accurate ION desired force tracking can be achieved.

Embodiment 2

Figure 9:
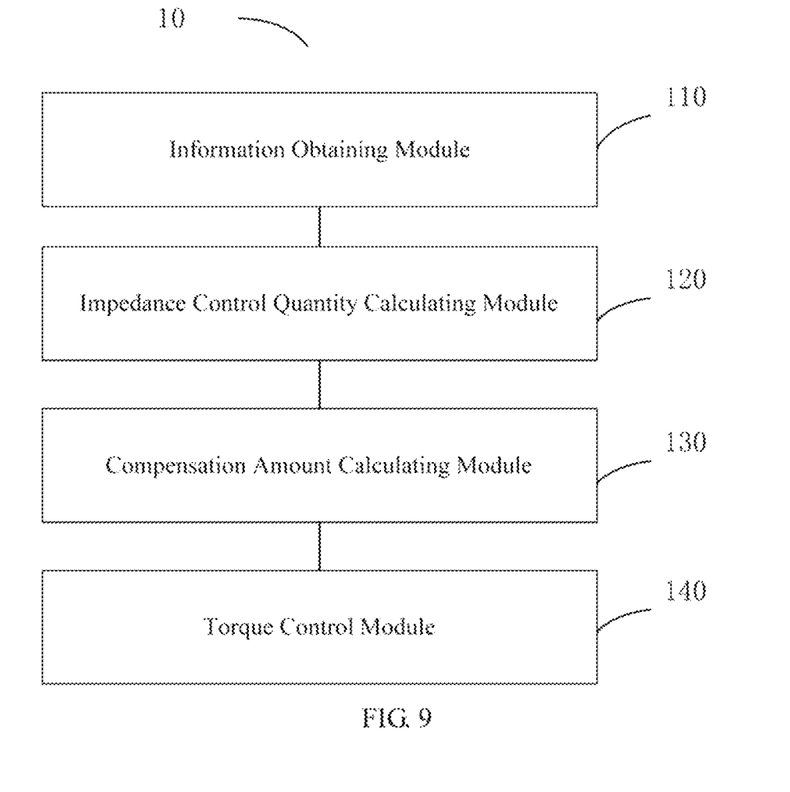
FIG. 9 is a schematic block diagram of an impedance control apparatus according to an embodiment of the present disclosure.

FIG. 9 is a schematic block diagram of an impedance control apparatus according to an embodiment of the present disclosure. As shown in FIG. 9, in this embodiment, an impedance control apparatus 10 is provided based on the impedance control method of the above-mentioned embodiment 1. The apparatus 10 includes:

an information obtaining module 110 configured to obtain current joint motion information and current joint force information in a joint space of the robotic arm and an actual interaction force acting on an end-effector of the robotic arm, and calculating actual motion information of the end-effector in the task space of the robotic arm based on the joint motion information through forward kinematics;

an impedance control quantity calculating module 120 configured to calculate a corrected desired trajectory of the end-effector using current environment information and a pre-planned desired end-effector interaction force in the task space, and calculating the impedance control torque of the robotic arm in the joint space based on the joint force information, the actual interaction force, the actual motion information of the end-effector, and desired end-effector information including the corrected desired trajectory;

a compensation amount calculating module 130 configured to construct a dynamics equation of the robotic arm, and determining a compensation torque based on a nonlinear term in the dynamics equation; and a torque control module 140 configured to perform a joint torque control on the robotic arm based on the impedance control torque and the compensation torque.

It can be understood that, the above-mentioned impedance control apparatus 10 corresponds to the impedance control method of embodiment 1. Any optional function in embodiment 1 are also applicable to this embodiment, and will not be described in detail herein.

The present disclosure further provides an impedance controller for controlling a robotic arm (or a robot). The controller includes a processor and a storage. In which, the storage stores a computer program, and the processor is for executing the computer program to implement the impedance control method of embodiment 1 or the function of each module of the impedance control apparatus 10 of embodiment 2.

The present disclosure further provides a robot including the above-mentioned impedance controller, which performs robotic arm torque control through the impedance controller, thereby realizing compliant control and the like. In one embodiment, the robot may be any robot such as a cutting robot, a welding robot, a grinding robot, and a massage robot.

The present disclosure further provides a non-transitory computer-readable storage medium for storing the computer program used in the above-mentioned impedance controller.

In the embodiments provided in the present disclosure, it should be understood that, the disclosed device (apparatus)s and method may also be implemented in other manners. The device embodiments described above are only schematic. For example, the flowcharts and schematic diagrams in the drawings show the possible architectures, functions, and operations according to the devices, methods, and computer program products of the embodiments of the present disclosure. In this regard, each block in the flowchart or block diagram may represent a module, program segment, or part of codes, and the module, program segment, or part of codes contains one or more executable instructions for realizing the specified logic functions. It should also be noted that, in alternative implementations, the functions marked in the blocks may also execute in a different order from the order marked in the drawings. For example, two consecutive blocks can actually be executed basically in parallel, or they can sometimes be executed in the reverse order, depending on the functions involved. It should also be noted that, each block in the schematic diagram and/or flowchart and the combination of the blocks in the schematic diagram and/or flowchart can be realized using a dedicated hardware-based system that executes specified functions or actions, or be realized using a combination of the dedicated hardware and computer instructions.

In addition, the functional modules or units in each embodiment of the present disclosure may be integrated together to form an independent part, or each module or unit may exist alone, or two or more modules or units may be integrated to form an independent part.

In the case that function(s) are implemented in the form of a software functional unit and sold or utilized as a separate product, they can be stored in a non-transitory computer readable storage medium. Based on this understanding, the technical solution of the present disclosure, either essentially or in part, contributes to the prior art, or a part of the technical solution can be embodied in the form of a software product. The software product is stored in a storage medium, which includes a plurality of instructions for enabling a computer device (which can be a smart phone, a personal computer, a server, a network device, or the like) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes The forgoing is only the specific embodiment of the present disclosure, while the scope of the present disclosure is not limited thereto. For those skilled in the art, changes or replacements that can be easily conceived within the technical scope of the present disclosure should be included within the scope of the present disclosure.

What is claimed is:

1. A computer-implemented impedance control method for a robotic arm, comprising steps of:

obtaining current joint motion information and current joint force information in a joint space of the robotic arm and an actual interaction force acting on an end-effector of the robotic arm, and calculating actual motion information of the end-effector in a task space of the robotic arm based on the joint motion information through forward kinematics;

calculating a corrected desired trajectory of the end-effector using current environment information and a pre-planned desired end-effector interaction force in the task space, and calculating the impedance control torque of the robotic arm in the joint space based on the joint force information, the actual interaction force, the actual motion information of the end-effector, and desired end-effector information including the corrected desired trajectory;

constructing a dynamics equation of the robotic arm, and determining a compensation torque based on a nonlinear term in the dynamics equation; and performing a joint torque control on the robotic arm based on the impedance control torque and the compensation torque.

2. The method of claim 1, wherein the dynamics equation is in the task space of the robotic arm, and the constructing the dynamics equation of the robotic arm comprises:

constructing the first dynamics equation of the robotic arm in the joint space; and converting the first dynamics equation in the joint space into the dynamics equation in the task space based on a motion relationship between each joint of the robotic arm and the end-effector.

3. The method of claim 2, wherein the constructing the first dynamics equation of the robotic arm in the joint space comprises:
calculating a force vector of the robotic arm, a centrifugal force and Coriolis force matrix, and a gravity vector based on the obtained joint motion information of the joint space; and
constructing the first dynamics equation of the robotic arm in the joint space based on the force vector, the centrifugal force and Coriolis force matrix, the gravity vector, the actual interaction force, and the joint force information.

4. The method of claim 3, wherein the nonlinear term in the dynamics equation of the task space includes a first nonlinear term containing the centrifugal force and Coriolis force matrix and a second nonlinear term containing the gravity vector, and the determining the compensation torque based on the nonlinear term in the dynamics equation comprises:
superimposing the first non-linear term and the second non-linear term as the compensation torque for performing non-linear compensation in the task space.

5. The method of claim 1, wherein the current environment information includes a current environment equivalent stiffness and a current environment position, and the calculating the corrected desired trajectory of the end-effector using current environment information and the pre-planned desired end-effector interaction force in the task space comprises:
calculating the corrected desired trajectory of the end-effector based on the current environment equivalent stiffness, the current environment position and the desired end-effector interaction force using an equation of:

$$x_{ref}^m = x_f - \frac{F_{ref}}{K_{eq}};$$

where, $x_{ref}^m$ represents the corrected desired trajectory, $x_f$ represents the environmental position, $K_{eq}$ represents the environment equivalent stiffness, and $F_{ref}$ represents the desired end-effector interaction force.

6. The method of claim 1, wherein the actual motion information includes a current actual position and a current actual speed of the end-effector, and the desired end-effector information includes a current desired speed and a current desired acceleration of the end-effector and the corrected desired trajectory, and the calculating the impedance control torque of the robotic arm in the joint space based on the joint force information, the actual interaction force, the actual motion information of the end-effector, and the desired end-effector information including the corrected desired trajectory comprises:
calculating a damping control quantity in the task space based on a positional deviation between the corrected desired trajectory and the actual position, a speed deviation between the desired speed and the actual speed, and the actual interaction force using a spring-mass-damping model;
converting the joint force information from the joint space into the task space, and calculating an acceleration control quantity in the task space based on the damping control quantity, the desired acceleration, and the converted joint force information; and
calculating the impedance control torque of the robotic arm in the joint space based on the acceleration control quantity in the task space using a Jacobian matrix.

7. The method of claim 6, wherein the joint motion information includes an angular displacement and an angular velocity of each joint of the robotic arm, and the calculating actual motion information of the end-effector in a task space of the robotic arm based on the joint motion information through forward kinematics comprises:
calculating the actual position and the actual velocity of the end-effector in the task space based on the angular displacement and the angular velocity of each joint through forward kinematics;
wherein, the angular displacement q and the angular velocity $\dot{q}$ of each joint of the robotic arm and the actual position x and the actual velocity $\dot{x}$ of the end-effector meet equations of:

$x=f(q);$ and $\dot{x}=J\dot{q};$ where, f(q) represents a mapping relationship between the angular displacement q of the joint and the position x of the end-effector, and J is a Jacobian matrix.

8. A controller for a robotic arm, comprising:
a processor;
a memory coupled to the processor, and
one or more computer programs stored in the memory and executable on the processor;
wherein, the one or more computer programs comprise:
instructions for obtaining current joint motion information and current joint force information in a joint space of the robotic arm and an actual interaction force acting on an end-effector of the robotic arm, and calculating actual motion information of the end-effector in a task space of the robotic arm based on the joint motion information through forward kinematics;
instructions for calculating a corrected desired trajectory of the end-effector using current environment information and a pre-planned desired end-effector interaction force in the task space, and calculating the impedance control torque of the robotic arm in the joint space based on the joint force information, the actual interaction force, the actual motion information of the end-effector, and desired end-effector information including the corrected desired trajectory;
instructions for constructing a dynamics equation of the robotic arm, and determining a compensation torque based on a nonlinear term in the dynamics equation; and
instructions for performing a joint torque control on the robotic arm based on the impedance control torque and the compensation torque.

9. The controller of claim 8, wherein the dynamics equation is in the task space of the robotic arm, and the instructions for constructing the dynamics equation of the robotic arm comprise:
instructions for constructing the first dynamics equation of the robotic arm in the joint space; and
instructions for converting the first dynamics equation in the joint space into the dynamics equation in the task space based on a motion relationship between each joint of the robotic arm and the end-effector.

10. The controller of claim 9, wherein the instructions for constructing the first dynamics equation of the robotic arm in the joint space comprise:
   instructions for calculating a force vector of the robotic arm, a centrifugal force and Coriolis force matrix, and a gravity vector based on the obtained joint motion information of the joint space; and
   instructions for constructing the first dynamics equation of the robotic arm in the joint space based on the force vector, the centrifugal force and Coriolis force matrix, the gravity vector, the actual interaction force, and the joint force information.

11. The controller of claim 10, wherein the nonlinear term in the dynamics equation of the task space includes a first nonlinear term containing the centrifugal force and Coriolis force matrix and a second nonlinear term containing the gravity vector, and the instructions for determining the compensation torque based on the nonlinear term in the dynamics equation comprise:
   instructions for superimposing the first non-linear term and the second non-linear term as the compensation torque for performing non-linear compensation in the task space.

12. The controller of claim 8, wherein the current environment information includes a current environment equivalent stiffness and a current environment position, and the instructions for calculating the corrected desired trajectory of the end-effector using current environment information and the pre-planned desired end-effector interaction force in the task space comprise:
   instructions for calculating the corrected desired trajectory of the end-effector based on the current environment equivalent stiffness, the current environment position and the desired end-effector interaction force using an equation of:

$$x_{ref}^m = x_f - \frac{F_{ref}}{K_{eq}};$$

where, $x_{ref}^m$ represents the corrected desired trajectory, $x_f$ represents the environmental position, $K_{eq}$ represents the environment equivalent stiffness, and $F_{ref}$ represents the desired end-effector interaction force.

13. The controller of claim 8, wherein the actual motion information includes a current actual position and a current actual speed of the end-effector, and the desired end-effector information includes a current desired speed and a current desired acceleration of the end-effector and the corrected desired trajectory, and the instructions for calculating the impedance control torque of the robotic arm in the joint space based on the joint force information, the actual interaction force, the actual motion information of the end-effector, and the desired end-effector information including the corrected desired trajectory comprise:
   instructions for calculating a damping control quantity in the task space based on a positional deviation between the corrected desired trajectory and the actual position, a speed deviation between the desired speed and the actual speed, and the actual interaction force using a spring-mass-damping model;
   instructions for converting the joint force information from the joint space into the task space, and calculating an acceleration control quantity in the task space based on the damping control quantity, the desired acceleration, and the converted joint force information; and
   instructions for calculating the impedance control torque of the robotic arm in the joint space based on the acceleration control quantity in the task space using a Jacobian matrix.

14. The controller of claim 13, wherein the joint motion information includes an angular displacement and an angular velocity of each joint of the robotic arm, and the instructions for calculating actual motion information of the end-effector in a task space of the robotic arm based on joint motion information through forward kinematics comprise:
   instructions for calculating the actual position and the actual velocity of the end-effector in the task space based on the angular displacement and the angular velocity of each joint through forward kinematics;
   wherein, the angular displacement q and the angular velocity q̇ of each joint of the robotic arm and the actual position x and the actual velocity ẋ of the end-effector meet equations of:

$$x = f(q); \text{ and}$$

$$\dot{x} = J\dot{q};$$

where, f(q) represents a mapping relationship between the angular displacement q of the joint and the position x of the end-effector, and J is a Jacobian matrix.

15. A robot comprising a controller, wherein the controller comprises:
   a processor;
   a memory coupled to the processor; and
   one or more computer programs stored in the memory and executable on the processor;
   wherein, the one or more computer programs comprise:
   instructions for obtaining current joint motion information and current joint force information in a joint space of the robotic arm and an actual interaction force acting on an end-effector of the robotic arm, and calculating actual motion information of the end-effector in a task space of the robotic arm based on the joint motion information through forward kinematics;
   instructions for calculating a corrected desired trajectory of the end-effector using current environment information and a pre-planned desired end-effector interaction force in the task space, and calculating the impedance control torque of the robotic arm in the joint space based on the joint force information, the actual interaction force, the actual motion information of the end-effector, and desired end-effector information including the corrected desired trajectory;
   instructions for constructing a dynamics equation of the robotic arm, and determining a compensation torque based on a nonlinear term in the dynamics equation; and
   instructions for performing a joint torque control on the robotic arm based on the impedance control torque and the compensation torque.

16. The robot of claim 15, wherein the dynamics equation is in the task space of the robotic arm, and the instructions for constructing the dynamics equation of the robotic arm comprise:
   instructions for constructing the first dynamics equation of the robotic arm in the joint space; and
   instructions for converting the first dynamics equation in the joint space into the dynamics equation in the task space based on a motion relationship between each joint of the robotic arm and the end-effector.

17. The robot of claim 16, wherein the instructions for constructing the first dynamics equation of the robotic arm in the joint space comprise:
- instructions for calculating a force vector of the robotic arm, a centrifugal force and Coriolis force matrix, and a gravity vector based on the obtained joint motion information of the joint space; and
- instructions for constructing the first dynamics equation of the robotic arm in the joint space based on the force vector, the centrifugal force and Coriolis force matrix, the gravity vector, the actual interaction force, and the joint force information.

18. The robot of claim 15, wherein the current environment information includes a current environment equivalent stiffness and a current environment position, and the instructions for calculating the corrected desired trajectory of the end-effector using current environment information and the pre-planned desired end-effector interaction force in the task space comprise:
- instructions for calculating the corrected desired trajectory of the end-effector based on the current environment equivalent stiffness, the current environment position and the desired end-effector interaction force using an equation of:

$$x_{ref}^m = x_f - \frac{F_{ref}}{K_{eq}};$$

where, $x_{ref}^m$ represents the corrected desired trajectory, $x_f$ represents the environmental position, $K_{eq}$ represents the environment equivalent stiffness, and $F_{ref}$ represents the desired end-effector interaction force.

19. The robot of claim 15, wherein the actual motion information includes a current actual position and a current actual speed of the end-effector, and the desired end-effector information includes a current desired speed and a current desired acceleration of the end-effector and the corrected desired trajectory, and the instructions for calculating the impedance control torque of the robotic arm in the joint space based on the joint force information, the actual interaction force, the actual motion information of the end-effector, and the desired end-effector information including the corrected desired trajectory comprise:
- instructions for calculating a damping control quantity in the task space based on a positional deviation between the corrected desired trajectory and the actual position, a speed deviation between the desired speed and the actual speed, and the actual interaction force using a spring-mass-damping model;
- instructions for converting the joint force information from the joint space into the task space, and calculating an acceleration control quantity in the task space based on the damping control quantity, the desired acceleration, and the converted joint force information; and
- instructions for calculating the impedance control torque of the robotic arm in the joint space based on the acceleration control quantity in the task space using a Jacobian matrix.

20. The robot of claim 19, wherein the joint motion information includes an angular displacement and an angular velocity of each joint of the robotic arm, and the instructions for calculating actual motion information of the end-effector in a task space of the robotic arm based on the joint motion information through forward kinematics comprise:
- instructions for calculating the actual position and the actual velocity of the end-effector in the task space based on the angular displacement and the angular velocity of each joint through forward kinematics;
- wherein, the angular displacement q and the angular velocity $\dot{q}$ of each joint of the robotic arm and the actual position x and the actual velocity $\dot{x}$ of the end-effector meet equations of:

$$x = f(q); \text{ and}$$

$$\dot{x} = J\dot{q};$$

where, f(q) represents a mapping relationship between the angular displacement q of the joint and the position x of the end-effector, and J is a Jacobian matrix.

* * * * *